(12) United States Patent
Drachmann

(10) Patent No.: US 10,107,660 B2
(45) Date of Patent: Oct. 23, 2018

(54) FLOW CONDUIT INSERT

(71) Applicant: APATOR MIITORS ApS, Aarhus V (DK)

(72) Inventor: Jens Drachmann, Viby J (DK)

(73) Assignee: APATOR MIITORS APS (DK)

( * ) Notice: Subject to any disclaimer, the term of this patent is extended or adjusted under 35 U.S.C. 154(b) by 25 days.

(21) Appl. No.: 15/328,384

(22) PCT Filed: Jul. 21, 2014

(86) PCT No.: PCT/DK2014/050229
§ 371 (c)(1),
(2) Date: Jan. 23, 2017

(87) PCT Pub. No.: WO2016/012024
PCT Pub. Date: Jan. 28, 2016

(65) Prior Publication Data
US 2017/0211956 A1     Jul. 27, 2017

(51) Int. Cl.
*G01F 1/66* (2006.01)

(52) U.S. Cl.
CPC ................... *G01F 1/662* (2013.01)

(58) Field of Classification Search
CPC ............. G01F 1/66; G01F 1/20; G01F 15/00
See application file for complete search history.

(56) References Cited

U.S. PATENT DOCUMENTS

| | | | | |
|---|---|---|---|---|
| 5,372,047 | A * | 12/1994 | Russwurm | G01F 1/662 73/861.27 |
| 5,390,204 | A * | 2/1995 | Yessik | H01S 3/117 372/13 |
| 2006/0288798 | A1 * | 12/2006 | Kroemer | G01F 1/662 73/861.18 |

FOREIGN PATENT DOCUMENTS

| | | |
|---|---|---|
| EP | 1493998 A2 | 1/2005 |
| EP | 2565593 A1 | 3/2013 |
| WO | 2014029405 A1 | 2/2014 |

* cited by examiner

*Primary Examiner* — Jewel V Dowtin
(74) *Attorney, Agent, or Firm* — St Onge Steward Johnston & Reens, LLC

(57) ABSTRACT

A flow conduit insert for inserting in a flow conduit of an ultrasonic flow meter. The flow conduit insert being designed for increasing the flow velocity of a fluid flowing through the flow conduit. The flow conduit insert includes a flow controlling arrangement, and a fixation arrangement. The flow controlling arrangement has an inner flow channel with a free passage along the longitudinal center axis of the flow conduit over the entire length of the flow conduit insert. The fixation arrangement is arranged to fixate at least one ultrasound reflector.

21 Claims, 6 Drawing Sheets

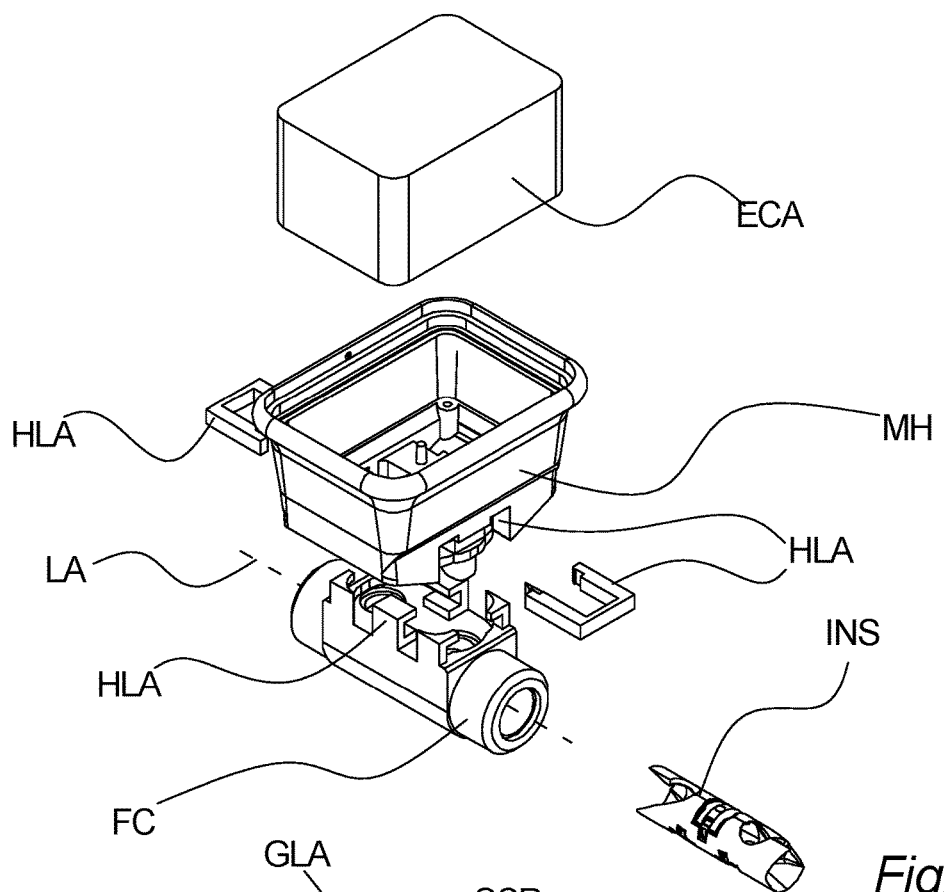
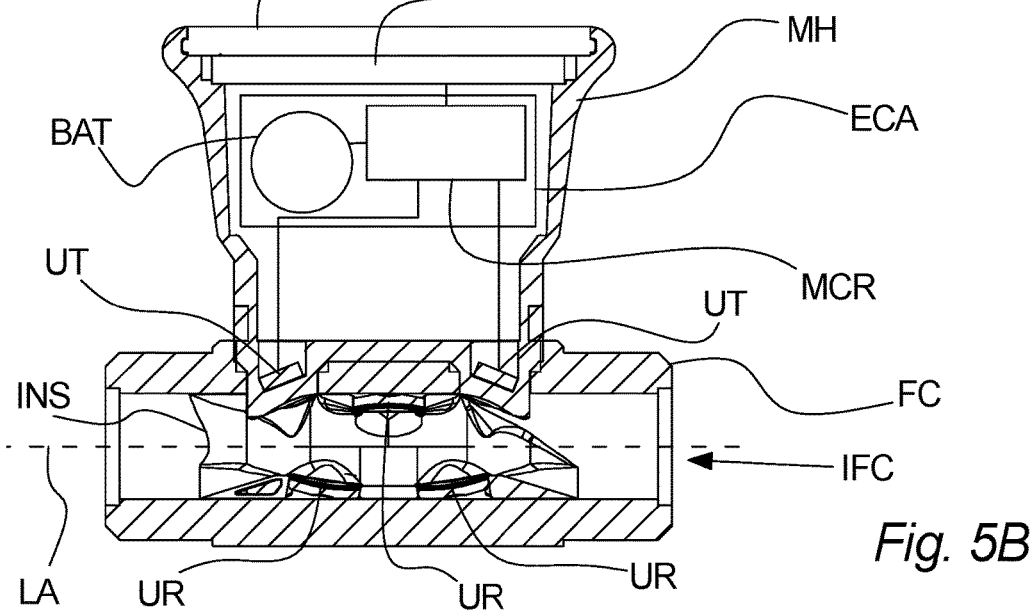
Fig. 5A
Fig. 5B

FLOW CONDUIT INSERT

FIELD OF INVENTION

The invention relates in to a flow conduit insert for inserting in a flow conduit to increase flow velocity.

BACKGROUND OF THE INVENTION

Several ultrasonic flow meters comprising inserts for inserting into a flow conduit of the meter are known in within the art. However, such flow meters and their inserts may suffer from several drawbacks, such as complicated assembly, low durability, high pressure loss, etc.

It is an object of the invention to solve one or more of these drawbacks.

SUMMARY OF THE INVENTION

The invention relates in a first aspect to flow conduit insert for inserting in a flow conduit of an ultrasonic flow meter, said flow conduit insert being adapted for increasing the flow velocity of a fluid flowing through said flow conduit, wherein said flow conduit insert comprises
a flow controlling arrangement, and
a fixation arrangement,
wherein said flow controlling arrangement defines an inner flow channel having free passage along the longitudinal center axis of the flow conduit over the entire length of the flow conduit insert,
wherein said fixation arrangement is arranged to fixate at least one ultrasound reflector.

One particular advantage of the invention may be that the flow velocity of the fluid flowing in the flow conduit is increased inside the inner flow channel of the flow conduit insert, compared to elsewhere on the flow conduit. Thereby, when installing said flow conduit insert with an ultrasonic flow meter, the part of the fluid on which the ultrasonic flow meter measures has an increased flow velocity due to the flow conduit insert. As the signal measured by the ultrasonic flow meter is modulated, the flow velocity, having an increased flow velocity results in a larger modulation, again leading to a larger sensitivity for the ultrasonic flow meter. This may especially be advantageous for ultrasonic flow meters measuring on relatively low velocity flows, where the signal may easily vanish in the noise without the flow conduit insert.

One important advantage of the invention may be that fixation of the at least one ultrasound reflector is facilitated by the flow conduit insert. Thereby, the correct path of the ultrasound may be secured. E.g. for ultrasonic flow meters, comprising two ultrasonic transducers, and one or more ultrasound reflectors, it may be advantageous to define the path of an ultrasound signal from one ultrasonic transducer to the other, and vice versa, by fixating the one or more ultrasound reflectors by the flow conduit insert inside the flow conduit.

One further advantage of the invention may be that the flow conduit insert may be assembled prior to installation of said ultrasound reflector in said flow conduit insert.

When inserted in the ultrasonic flow meter, which may e.g. comprise two transducers, these transducers together with the at least one ultrasound reflector defines the path of an ultrasound signal from the emission by the first ultrasonic transducer, via said at least one ultrasound reflector, and onto said second ultrasound transducer, and vice versa.

Preferably, by said entire length of said flow conduit insert is to be understood the entire longitudinal length, i.e. the distance, parallel to the longitudinal axis of the flow conduit, from one end of the flow conduit insert to the opposite end of the flow conduit insert.

Also, it should preferably be understood that said free passage is free passage for the fluid to be measured, i.e. the inner flow channel can be filled, at least partly, by the fluid to be measured, said fluid then being able to move through the inner flow channel.

According to an advantageous embodiment of the invention, said flow conduit insert is provided as a single, self-supporting flow conduit insert.

One significant advantage of the above embodiment may be that the flow conduit insert, including the ultrasound reflector and the fixation arrangement, may be provided as a single assembled self-supporting element. This may provide for advantageous assembly of the ultrasonic flow meter, where the single self-supporting element may be assembled at one workstation, and inserted into the flow conduit at a separate workstation, or in a separate assembly step. The self-supporting nature of the flow conduit insert may secure that the flow conduit insert does not need external support to avoid disassembly, thereby facilitating the above mentioned advantages.

According to an advantageous embodiment of the invention, said flow controlling arrangement comprises at least two controlling arrangement parts, and said fixation arrangement is arranged to lock the at least two controlling arrangement parts together to form a self-supporting flow conduit insert.

One advantage of the above embodiment may be that the flow controlling arrangement may be manufactured in a relatively simple manner. For many configurations of the flow controlling arrangement, it may not be possible to manufacture the flow controlling arrangement in one piece, at least by conventional production methods, such as injection molding etc. Although it may be possible to produce complicated designs via 3D-printing, it is emphasized that such methods may often involve substances, which are unsuitable for many applications, such as in water meters, and particularly water meters for drinking water, and/or that such methods may not be as accurate as conventional methods, and that such methods may be more expensive. Therefore, by assembling the flow controlling arrangement from two or more parts, and holding these together with a fixation arrangement, an advantageous solution may be obtained.

According to an embodiment of the invention, said flow conduit insert comprises at least a first and a second controlling arrangement part.

According to an advantageous embodiment of the invention, said at least two controlling arrangement parts are substantially symmetric.

One advantage of the above embodiment may be that the two parts may more easily be manufactured, e.g. if the two parts are identical.

According to an advantageous embodiment of the invention, said at least two controlling arrangement parts are substantially symmetric about an axis.

Said axis may preferably be an axis perpendicular to the longitudinal direction of the flow conduit. Also, it may preferably be an axis positioned substantially in the center of a division surface between said two controlling arrangement parts. Also, it may preferably be an axis substantially parallel to a division surface between said two controlling arrangement parts. Also, the symmetry may preferably be a rotational symmetry, i.e. one part may be rotated about said axis to the second part.

According to an advantageous embodiment of the invention, said ultrasound reflector is fixated between said flow controlling arrangement and said fixation arrangement.

One advantage of the above embodiment may be that it facilitates fixation of the ultrasound reflectors in a relatively simple matter, specifically where assembly of the flow conduit insert may be relatively simple. In some embodiments, the flow controlling arrangement may comprise one or more reflector recesses, each for receiving an ultrasound reflector, and where the fixation arrangement connects to the flow controlling arrangement thereby providing a clamping fixation of the ultrasound reflector between the flow controlling arrangement and the fixation arrangement, i.e. such that the flow controlling arrangement exerts a force on the ultrasound reflector in a first direction, and the fixation arrangement exerts a force on the ultrasound reflector in a second direction substantially opposite to the first direction.

According to an advantageous embodiment of the invention, said fixation arrangement is arranged to fixate said at least two controlling arrangement parts to each other.

One advantage of the above embodiment may be that further to fixating said at least one ultrasound reflector, the fixation arrangement also provides fixation of said at least two controlling arrangement parts to form a single, self-supporting flow conduit insert.

According to an advantageous embodiment of the invention, said fixation arrangement comprises one or more fixation elements, said one or more fixations elements each comprising one or more fixation element locking parts, said at least two controlling arrangement parts each comprises one or more controlling arrangement locking parts, and said one or more fixation element locking parts are adapted to engage said one or more controlling arrangement locking parts, whereby said ultrasound reflector is fixated between said flow controlling arrangement and said fixation arrangement, and whereby said at least two controlling arrangement parts is fixated to each other.

One significant advantage of the above embodiment may be that said flow controlling arrangement, provided as e.g. two parts, said fixation arrangement may facilitate fixation of said first and second controlling arrangement parts to each other, and at the same time facilitating fixation of said ultrasound reflector to said flow conduit insert, thereby providing a single, assembled, self-supporting flow conduit insert.

According to an embodiment of the invention, said fixation arrangement comprises one or more fixation elements, said one or more fixations elements each comprising one or more fixation element locking parts, said at least two controlling arrangement parts each comprises one or more controlling arrangement locking parts, and said one or more fixation element locking parts are adapted to engage said one or more controlling arrangement locking parts, whereby said ultrasound reflector is fixated between said flow controlling arrangement and said fixation arrangement.

According to an advantageous embodiment of the invention, said fixation arrangement comprises one or more fixation elements, said one or more fixations elements each comprising one or more fixation element locking parts, said at least two controlling arrangement parts each comprises one or more controlling arrangement locking parts, and said one or more fixation element locking parts are adapted to engage said one or more controlling arrangement locking parts, whereby said at least two controlling arrangement parts is fixated to each other.

According to an advantageous embodiment of the invention, said fixation arrangement comprises a reflector locking arrangement for receiving and fixating said ultrasound reflector.

In embodiments where the fixation arrangement comprises two or more fixation elements, each fixation element may be provided with a separate reflector locking arrangement so as to each fixate an ultrasound reflector.

According to an advantageous embodiment of the invention, said reflector locking arrangement comprises one or more projections and/or one or more grooves to lock said ultrasound reflector.

In connection with the above embodiment, it should be understood that the projections and/or grooves may be adapted to provide elastic deformation so as to allow an ultrasound reflector to engage the projection and/or groove, but not so much that the ultrasound reflector is not sufficiently maintained and locked by the projections and/or grooves. This may e.g. be provided by the projections and/or grooves being adapted to elastically deform up to 0.3 millimeters without breaking.

Also, it should be understood that said projections and/or grooves may be positioned to surround the ultrasound reflector. Furthermore, the length of the projections and/or grooves may be rather short, or alternatively run along a larger portion of the periphery of the ultrasound reflector.

According to an advantageous embodiment of the invention, said reflector locking arrangement provides fixation of said ultrasound reflector without contact between said ultrasound reflector and said flow controlling arrangement.

One advantage of the above embodiment may be that the ultrasound reflector is fixated entirely by the reflector locking arrangement of the fixation arrangement. Still, the fixation arrangement may be positioned inside said flow conduit by said flow controlling arrangement.

One advantage of the above embodiment may be a more durable fixation, since the ultrasound reflector is fixated only by one element, thereby avoiding fixation between two or more parts. Such fixation between two or more parts may, in some cases, be less effective over time, especially if the two or more parts move relative to other.

One advantage of the above embodiment may be a simpler assembly of said flow conduit insert, by reducing the number of parts not yet locked together that has to be handled during the assembly. In an example embodiment an ultrasound reflector is first installed in the fixation arrangement. Thereafter, the resulting assembled part is installed on the flow controlling arrangement to form a flow conduit insert. In such an embodiment only two parts are handled at once. In other example embodiments, three or more separate parts need to be handled at once, however, without employing the solution of the above embodiment that number of separate parts to be handled at once may be even higher.

According to an advantageous embodiment of the invention, said fixation arrangement forms said at least one ultrasound reflector.

The ultrasound reflector, which may be e.g. a metal reflector, such as a brass or stainless steel reflector, may in fact, according to the above embodiment, be provided as a part of the fixation arrangement. For example, by providing a reflector having projections, recesses and/or grooves, the ultrasound reflector may thereby form the fixation arrangement, and vice versa.

According to an advantageous embodiment of the invention, said fixation arrangement comprises one or more fixation elements, each fixation element comprises at least one fixation element locking part for connecting and locking to said flow controlling arrangement.

According to an advantageous embodiment of the invention, said flow controlling arrangement comprises one or more controlling arrangement parts, each of said controlling arrangement parts comprising a controlling arrangement locking part for connecting to said fixation arrangement.

According to an advantageous embodiment of the invention, said fixation element locking part and said controlling arrangement locking part are adapted for interlocking by mechanically engaging each other.

One advantage of the above embodiment may be that said mechanical engagement provides fixation between said one or more fixation elements and said flow controlling arrangement.

According to an advantageous embodiment of the invention, said controlling arrangement locking part and said fixation element locking part form a fixation protrusion and a receiving fixation recess for interlocking by mechanically engaging each other.

According to an embodiment, the controlling arrangement locking part comprises the fixation protrusion and said fixation element locking part comprises the receiving fixation recess.

According to an embodiment, the controlling arrangement locking part comprises the receiving fixation recess and said fixation element locking part comprises the fixation protrusion.

According to an advantageous embodiment of the invention, said ultrasonic flow meter comprises at least two ultrasound reflectors, such as at least three ultrasound reflectors.

According to an advantageous embodiment of the invention, said at least two ultrasound reflectors, such as at least three ultrasound reflectors, are fixated said fixation arrangement.

According to an advantageous embodiment of the invention, said at least two ultrasound reflectors, such as at least three ultrasound reflectors, each are fixated between said at least two controlling arrangement parts on one side and said fixation arrangement on the other side.

It should be understood, in connection with the above embodiments, that it may, depending on the particular setup, be advantageous to have more than one ultrasound reflector to define the path of the ultrasound signal satisfactory. However, in some setups, it may be advantageous to limit the number of ultrasound reflectors, e.g. to three, two or even one. Often, especially for ultrasonic transit time flow meters, it may also be an advantage to have an odd number of ultrasound reflectors, especially one or three ultrasound reflectors, since a sensitive flow meter having a flow conduit insert providing inflicting a relatively low pressure low may be obtained, while still having two ultrasonic transducers positioned on the same side of the flow conduit, and therefore in the same meter housing.

According to an advantageous embodiment of the invention, said flow conduit insert comprises a recess, preferably an outer reflector recess, for receiving said ultrasound reflector.

One significant advantage of the above embodiment may be that the ultrasound reflectors are fixated in a position away from the center longitudinal axis of the flow conduit, thereby reducing the impeding of the flow of the fluid inside the flow conduit insert.

According to an advantageous embodiment of the invention, said reflector recess is provided partly in said first controlling arrangement part and partly in said second controlling arrangement part, so that the full reflector recess is formed when joining said first and second controlling arrangement parts.

According to an advantageous embodiment of the invention, said reflector recess is provided in said first controlling arrangement part or in said second controlling arrangement part.

According to an advantageous embodiment of the invention, said flow controlling arrangement comprises an opening from said inner flow channel to the outside of said flow controlling arrangement, and wherein said opening substantially coincides with said reflector recess, preferably provided as an outer reflector recess.

According to an advantageous embodiment of the invention, said fixation arrangement is adapted to fixate said ultrasound reflector in said reflector recess.

According to an advantageous embodiment of the invention, said flow controlling arrangement consists essentially of a first controlling arrangement part and a second controlling arrangement part.

It should be understood, according to an embodiment, that said first controlling arrangement part and a second controlling arrangement part defines the flow of a fluid through said flow conduit insert.

According to an advantageous embodiment of the invention, said flow conduit insert is adapted for fixating an ultrasound reflector of said ultrasonic flow meter to said flow controlling arrangement via a fixation arrangement.

According to an advantageous embodiment of the invention, said at least two controlling arrangement parts are each provided with a slot and/or a projection, said slot(s) and said projection(s) being configured for engaging each other when joining said at least two controlling arrangement parts.

One advantage of the above embodiment may be that the assembly of the controlling arrangement parts is made simpler and/or that the fixation between the controlling arrangement parts may be stronger.

According to an advantageous embodiment of the invention, said fixation arrangement comprises one or more fixation elements, each of said one or more fixation elements having a maximum dimension not exceeding 80% of the diameter of the flow conduit, preferably not exceeding 70%, more preferably not exceeding 60%, even more preferably not exceeding 50%.

In some further embodiments, the fixation elements may be even smaller, compared to the diameter of the flow conduit. In some example embodiments, the fixation elements have a maximum dimension not exceeding 40% of the diameter of the flow conduit, such as not exceeding 30%, such as not exceeding 20%.

One advantage of providing fixation elements that are relatively small compared to the diameter of the flow conduit, may be that an effective fixation of one or more ultrasound reflectors and/or of controlling arrangement parts to each other may be facilitated without wasting material on large fixation arrangements, and, at the same time, facilitating a relatively simple and easy assembly of the flow conduit insert.

According to an advantageous embodiment of the invention, said inner flow channel has a minimum see-through cross-sectional dimension of at least 30% of the diameter of the flow conduit, preferably at least 40%, more preferably at least 50%, most preferably at least 60%.

One advantage of the above embodiment may be that the pressure loss caused by the flow controlling arrangement is reduced.

According to an embodiment of the invention, said minimum diameter is between 30% and 90% of the diameter of the flow conduit, such as between 40% and 90%, such as between 50% and 90%, such as between 60% and 90%, or such as between 30% and 80%, such as between 40% and 80%, such as between 50% and 80%, such as between 60% and 80%, or such as between 30% and 70%, such as between 40% and 70%, such as between 50% and 70%, such as between 60% and 70%.

Preferably, in connection with the above embodiment, it should be understood that the minimum diameter may be a minimum see-through diameter or minimum cross-sectional dimension of a see-through part of said inner flow channel. Alternatively, in connection with the above embodiment, the minimum diameter may be a minimum diameter of the inner flow channel.

According to an advantageous embodiment of the invention, said inner flow channel has a minimum see-through cross-sectional dimension of at least 3 millimeters, preferably at least 5 millimeters, such as at least 7 millimeters, such as at least 10 millimeters, such as at least 12 millimeters, such as at least 15 millimeters, such as at least 20 millimeters, such as at least 25 millimeters, such as at least 30 millimeters.

One advantage of the above embodiment may be that the pressure loss caused by the flow controlling arrangement is reduced.

According to an embodiment said inner flow channel has a minimum diameter between 3 millimeters and 200 millimeters, preferably between 5 millimeters and 200 millimeters, such as between 7 millimeters and 200 millimeters, such as between 10 millimeters and 200 millimeters, such as between 12 millimeters and 200 millimeters, such as between 15 millimeters and 200 millimeters, such as between 20 millimeters and 200 millimeters, such as between 25 millimeters and 200 millimeters, such as between 30 millimeters and 200 millimeters. However, the upper limit of the minimum diameter may also be higher, such as up to e.g. 500 millimeters, or lower, such as up to 50 or 75 millimeters.

Preferably, in connection with the above embodiment, it should be understood that the minimum diameter may be a minimum see-through diameter or minimum cross-sectional dimension of a see-through part of said inner flow channel. Alternatively, in connection with the above embodiment, the minimum diameter may be a minimum diameter of the inner flow channel.

In many cases, the inner flow channel may deviate more or less from a straight form. Although such deviation may in some cases be negligible, it may on other cases have an actual impact on the flow of fluid through the flow channel.

According to an embodiment of the invention, said flow controlling arrangement, such as said controlling arrangement parts, is made substantially from a composite material, such as a glass reinforced polymer, such as polybutylene sulfide (PBS).

According to an embodiment of the invention, said fixation arrangement, such as said fixation elements, is made substantially from a composite material, such as a glass reinforced polymer, such as polybutylene sulfide (PBS).

According to an advantageous embodiment of the invention, said fixation arrangement comprises two or more fixation elements, wherein said two or more fixation elements are substantially identical.

One advantage of the above embodiment may be that the manufacturing of the two or more fixation elements may be done at a lower cost, e.g. since the same production equipment may be used for the two or more fixation elements.

According to an advantageous embodiment of the invention, said fixation arrangement comprises two or more fixation elements, wherein said two or more fixation elements are substantially mirror symmetric.

One advantage of the above embodiment may be that the fixation elements are more easily installed. Typically, each fixation element may comprise two or more fixation element locking parts. If the fixation elements are symmetric, e.g. such that the fixation element locking parts are identical, installing the fixation elements may be simpler, as the person performing the installation does not need to worry about discerning one fixation element locking part from another fixation element locking part.

According to an advantageous embodiment of the invention, said fixation arrangement comprises two or more fixation elements, wherein each of said two or more fixation elements comprises two or more fixation element locking parts, wherein said two or more fixation element locking parts are substantially identical.

One advantage of the above embodiment may be that the fixation elements are more easily installed. Typically, each fixation element may comprise two or more fixation element locking parts. If the fixation elements are symmetric such that the fixation element locking parts are identical, installing the fixation elements may be simpler, as the person performing the installation does not need to worry about discerning one fixation element locking part from another fixation element locking part.

According to an embodiment of the invention said flow conduit insert is adapted to have a longitudinal length being greater than its diameter. I.e. the length of the flow conduit insert measured in a direction substantially parallel to the direction of the longitudinal axis of the flow conduit is longer than the inner diameter of the flow conduit. In example embodiments, the longitudinal length of the flow conduit insert is at least 1.5 times the inner diameter of the flow conduit, or at least twice the inner diameter of the flow conduit, or at least three times the inner diameter of the flow conduit, or at least four times the inner diameter of the flow conduit.

The invention relates in a second aspect to a flow conduit insert for inserting in a flow conduit of an ultrasonic flow meter, said flow conduit insert being adapted for increasing the flow velocity of a fluid flowing through said flow conduit, wherein said flow conduit insert comprises a flow controlling arrangement, and a fixation arrangement, wherein said flow controlling arrangement defines an inner flow channel having free passage along the longitudinal center axis of the flow conduit over the entire length of the flow conduit insert, and wherein said flow controlling arrangement comprises at least two controlling arrangement parts, wherein said fixation arrangement is arranged to lock the at least two controlling arrangement parts together to form a self-supporting flow conduit insert.

According to an embodiment of the invention, said fixation arrangement is arranged to fixate at least one ultrasound reflector.

The flow conduit insert according to any embodiment of the second aspect of the invention may be devised according to any embodiment of the first aspect of the invention.

The invention relates in a third aspect to an ultrasonic flow meter, said ultrasonic flow meter comprising
flow conduit for transport of a fluid to be measured,
a flow conduit insert for increasing the flow velocity of a fluid flowing through said flow conduit,
at least one ultrasonic transducer for transmitting and/or receiving an ultrasonic signal, and
at least one ultrasound reflector for reflecting said ultrasound signal,
wherein said flow conduit insert comprises a flow controlling arrangement,
wherein said flow conduit insert is inserted in said flow conduit, and wherein said flow controlling arrangement defines an inner flow channel having free passage along the longitudinal center axis of the flow conduit over the entire length of the flow conduit insert.

According to an advantageous embodiment of the invention, the ultrasonic flow meter according to the third aspect of the invention comprises a flow conduit insert according to the first and/or second aspect of the invention and/or any embodiment thereof.

According to an advantageous embodiment of the invention, said ultrasonic flow meter is adapted for measuring a flow of a fluid by transit-time measurement.

The invention relates in a fourth aspect to a method of assembling an ultrasonic flow meter according to the third aspect of the invention or any embodiment thereof, said method comprising the steps of
providing said flow controlling arrangement,
fixating to said flow controlling arrangement said at least one ultrasound reflector by said fixation arrangement,
inserting said flow conduit insert into said flow conduit of said ultrasonic flow meter.

According to an advantageous embodiment of the invention, said ultrasound reflector is inserted in said fixation element, said fixation element thereafter being fixated to said flow controlling arrangement.

The invention relates in a fifth aspect to a method of assembling a flow conduit insert according to the first or second aspect of the invention or any embodiment thereof, said method comprising the steps of
providing said flow controlling arrangement, and
fixating to said flow controlling arrangement said at least one ultrasound reflector by said fixation arrangement.

According to an advantageous embodiment of the invention, said step of providing said flow controlling arrangement comprises the steps of
providing at least two controlling arrangement parts,
fixating to each other said at least two controlling arrangement part by said fixation arrangement to form a self-supporting flow controlling arrangement.

BRIEF DESCRIPTION OF THE DRAWINGS

The invention will be described in the following with reference to the figures in which
FIG. 5A illustrates an exploded view of an ultrasonic flow meter according to an embodiment of the invention,
FIG. 5B illustrates a cross-sectional side view an ultrasonic flow meter according to an embodiment of the invention.

DETAILED DESCRIPTION OF THE INVENTION

Figure 1:
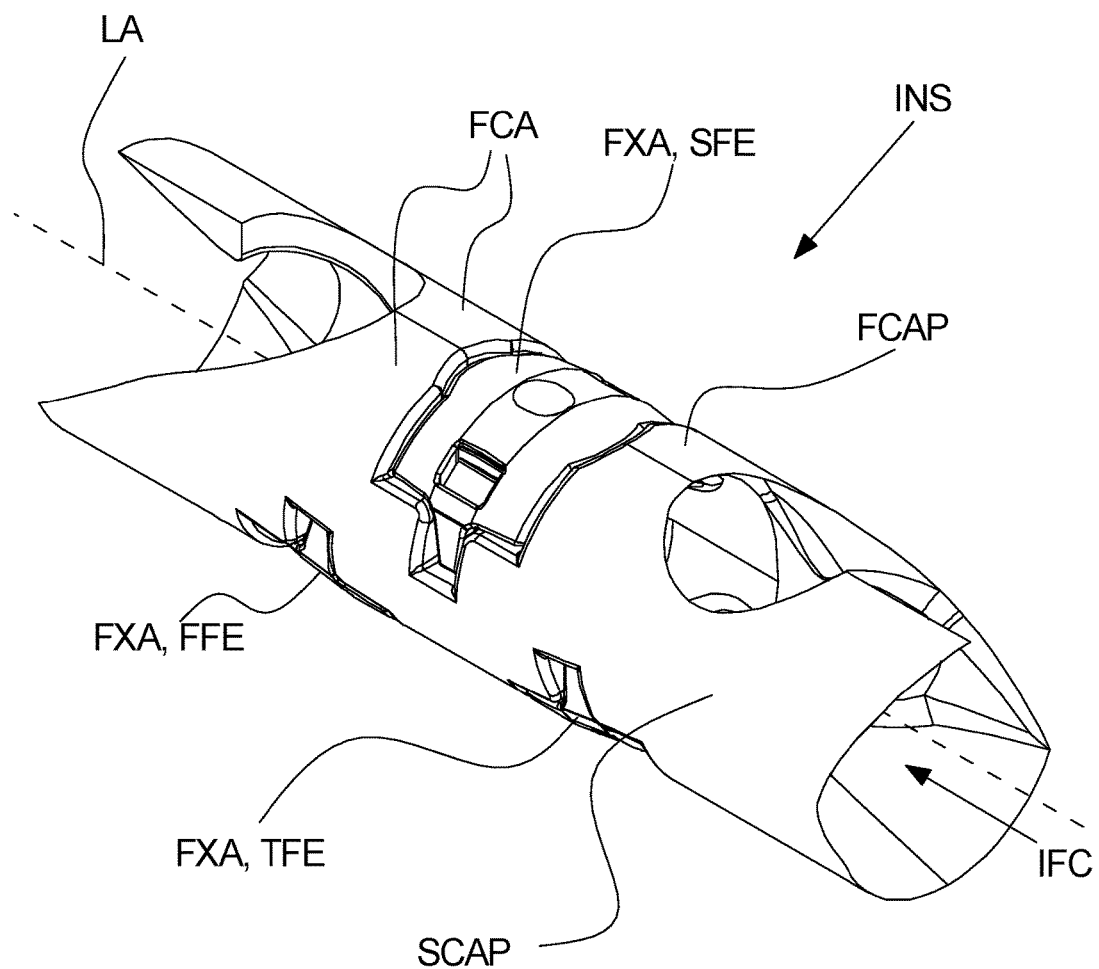
FIG. 1 illustrates a flow conduit insert according to an embodiment of the invention.

In the context of the present invention, the term "flow conduit" is to be understood as a means of transmitting or distributing a fluid, such a channel through which a fluid is conveyed. The channel may e.g. be understood as a tube or a pipe. The fluid may comprise liquids and/or gasses. Particularly, the fluid may be water, such as drinking water, or other drinkable liquids.

In the context of the present invention, the term "flow conduit insert" is to be understood as an insert for inserting into a flow conduit. Preferably, the flow conduit insert is inserted axially into the flow conduit. Also, the outer diameter of the flow conduit insert preferably corresponds, at least substantially, to the inner diameter of the flow conduit.

In the context of the present invention, the term "fixation arrangement" is to be understood as a connection arrangement providing fixation. For example, it may provide fixation between the at least two parts of the flow controlling arrangement, or provide fixation of said ultrasound reflector e.g. relative to said flow conduit insert, or it may provide both fixations. It should be understood that it may, in some particular embodiments also provide fixation of further parts, e.g. if said flow controlling arrangement comprises three or more parts.

In the context of the present invention, the term "flow velocity" is to be understood as the velocity of the fluid at a particular position, or an average of velocities over an area or a volume. It should be understood as an actual velocity, i.e. measuring length per time, rather than a volumetric flow rate measuring volume per time.

In the context of the present invention, by "said flow conduit insert being adapted for increasing the flow velocity of a fluid flowing through said flow conduit" is to be understood in relation to the same system before or after the flow conduit insert, i.e. at the same flow rate. I.e. the flow velocity inside the flow conduit insert is, for a constant flow rate, higher than before and after the flow conduit insert, due to a decreased cross section of the flow conduit insert.

In the context of the present invention, the term "ultrasonic flow meter" is to be understood as a meter for measuring flow of a fluid by means of an ultrasound signal. Ultrasonic flow meters comprise one or more ultrasonic transducers for transmitting and/or receiving an ultrasound signal. Preferably, the ultrasonic flow meter comprises two ultrasonic transducers. Preferably, the ultrasonic flow meter is adapted to measure the flow of a fluid by a transit time measurement.

In the context of the present invention, the term "flow controlling arrangement" is to be understood as an arrangement for controlling the flow of a fluid inside the flow conduit. Specifically, the flow controlling arrangement may facilitate, at least partly, an increase in flow velocity of the fluid inside the inner flow channel of the flow conduit insert.

In the context of the present invention, the term "inner flow channel" is to be understood as an channel of free passage for the fluid, the inner flow channel running along the entire length of the flow conduit insert, i.e. from a first end of the flow conduit insert to the opposite end of the flow conduit insert, thereby defining an opening for the fluid to flow in, from one end of the flow conduit to the opposite end of the flow conduit. The inner flow channel covers the longitudinal center axis of the flow conduit over the entire length of the flow conduit insert, i.e. fluid may flow at least at the center of the flow conduit along the entire length of the flow conduit insert.

In the context of the present invention, the term "ultrasound reflector" is to be understood as an object that is used to reflect ultrasound. Typically, it may comprise a piece of stainless steel or brass having a relatively smooth surface. In some cases, ultrasound reflectors are focusing, i.e. defining a concave surface facilitating focusing of the ultrasound signal.

Referring to FIG. 1, an embodiment of the invention is described. Here, a flow conduit insert INS is shown in assembled form.

The flow conduit insert INS comprises a flow controlling arrangement FCA, which is formed by a first and a second controlling arrangement parts FCAP, SCAP. It is noted that in other embodiments, the flow controlling arrangement may be formed by one a single part, or by three or more controlling arrangement parts FCAP, SCAP. Typically, it may be an advantage, seen from the point of view of assembly, to have the least possible parts, since this may simplify assembly of the flow conduit insert INS significantly. However, from the point of view of manufacturing the one or more controlling arrangement parts FCAP, SCAP, it may often be an advantage to have at least two, and in some cases three or more controlling arrangement parts FCAP, SCAP, since this may facilitate simple and/or cheap forming of the controlling arrangement parts, e.g. from a plastic, e.g. by injection molding. Especially if the flow controlling arrangement FCA has a more complicated design, more than one controlling arrangement part FCAP, SCAP, such as two, may be advantageous.

As seen on FIG. 1, the flow controlling arrangement FCA forms an inner flow channel IFC extending through the inside of the flow controlling arrangement FCA, and defining a free space for a fluid to move through.

Also, the flow conduit insert INS comprises a fixation arrangement FXA. The fixation arrangement FXA comprises a first fixation element FFE, a second fixation element SFE, and a third fixation element TFE. The fixation arrangement FXA is arrangement to fixate the first and second controlling arrangement parts FCAP, SCAP together to form the flow controlling arrangement FCA.

Furthermore, in some embodiments, the fixation arrangement FXA may also fixate ultrasound reflectors (not shown), further to fixating said first and second controlling arrangement parts FCAP, SCAP to each other.

The longitudinal center axis LA of the flow conduit FC is illustrated on FIG. 1.

Furthermore, FIG. 1 illustrates a flow conduit insert INS according to an embodiment, the flow conduit insert INS being adapted for inserting in a flow conduit FC (not shown) of an ultrasonic flow meter UFM (not shown). The flow conduit insert INS is adapted for increasing the flow velocity of a fluid flowing through said flow conduit FC (not shown). The flow conduit insert INS comprises a flow controlling arrangement FCA, and a fixation arrangement FXA. The flow controlling arrangement FCA defines an inner flow channel IFC having free passage along the longitudinal center axis LA of the flow conduit FC (not shown) over the entire length of the flow conduit insert INS. The fixation arrangement FXA is arranged to fixate at least one ultrasound reflector UR (not shown).

Figure 2:
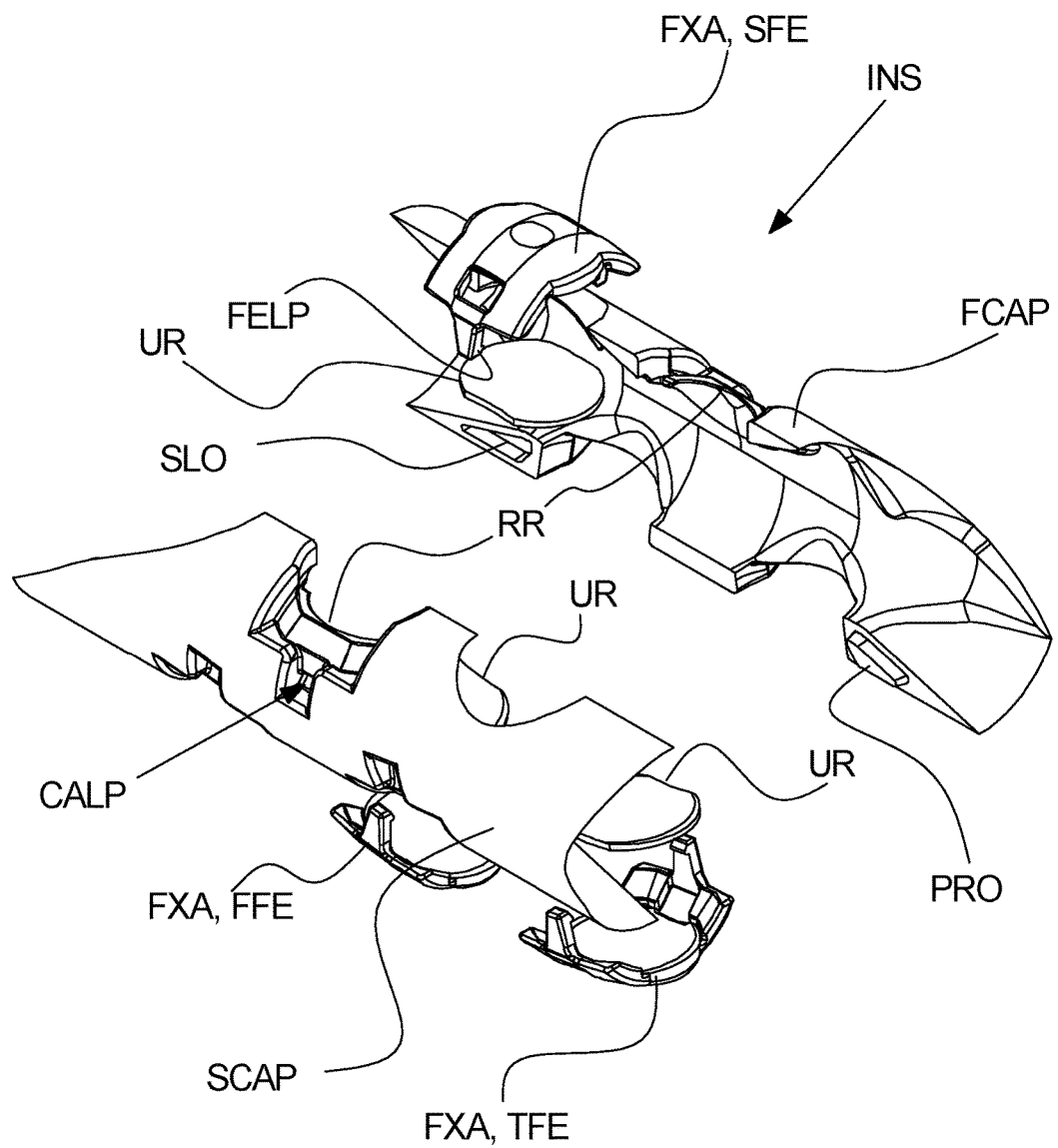
FIG. 2 illustrates an exploded view of a flow conduit insert according to an embodiment of the invention.

Now, referring to FIG. 2, a flow conduit insert INS according to a further embodiment of the invention is illustrated. The flow conduit insert INS is here shown in an exploded view, and may after assembly form the flow conduit insert INS illustrated in FIG. 1, or flow conduit inserts INS according to other embodiments.

As shown on FIG. 2, the flow conduit insert INS is adapted to fixate three ultrasound reflectors UR. After fixation, these reflectors UR are positioned and oriented so as to define a path for an ultrasound signal from one or more transducers in an ultrasonic flow meter UFM.

The fixation elements FFE, SFE, TFE are adapted to fixate said ultrasound reflectors UR. For example, the fixation of the ultrasound reflectors UR may be provided by clamping each reflector UR between the flow controlling arrangement FCA and a fixation element FFE, SFE, TFE.

This clamping fixation may e.g. be provided by first moving the controlling arrangement parts FCAP, SCAP together to form the flow controlling arrangement FCA. Then, the ultrasound reflector UR is positioned at a reflector recess RR. The reflector recess RR may be formed from a partial reflector recess on each of the first and second controlling arrangement parts FCAP, SCAP (as shown on FIG. 2), or, alternatively, may be provided on one of the first and second controlling arrangement parts FCAP, SCAP. Then, after positioning the ultrasound reflector UR in the reflector recess RR, the fixation element FFE, SFE, TFE is inserted into the reflector recess RR over the ultrasound reflector UR. The fixation element FFE, SFE, TFE then provides fixation to both the first and second controlling arrangement part FCAP, SCAP, thereby locking them together to form the flow controlling arrangement FCA, while also, as explained above, fixating the ultrasound reflector UR.

In alternative embodiments, where each reflector recess is positioned on one of said controlling arrangement parts FCAP, SCAP, the particular fixation element FFE, SFE, TFE may be arranged to still provide fixation between the first and second controlling arrangement parts FCAP, SCAP, or may be arranged to only fixate the particular ultrasound reflector UR.

Figure 3A:
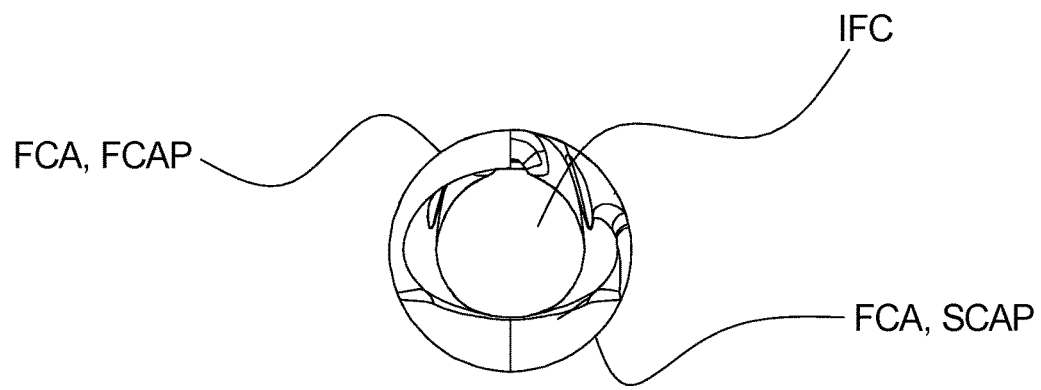
FIG. 3A illustrates an end view of a flow conduit insert according to an embodiment of the invention.
Figure 3B:
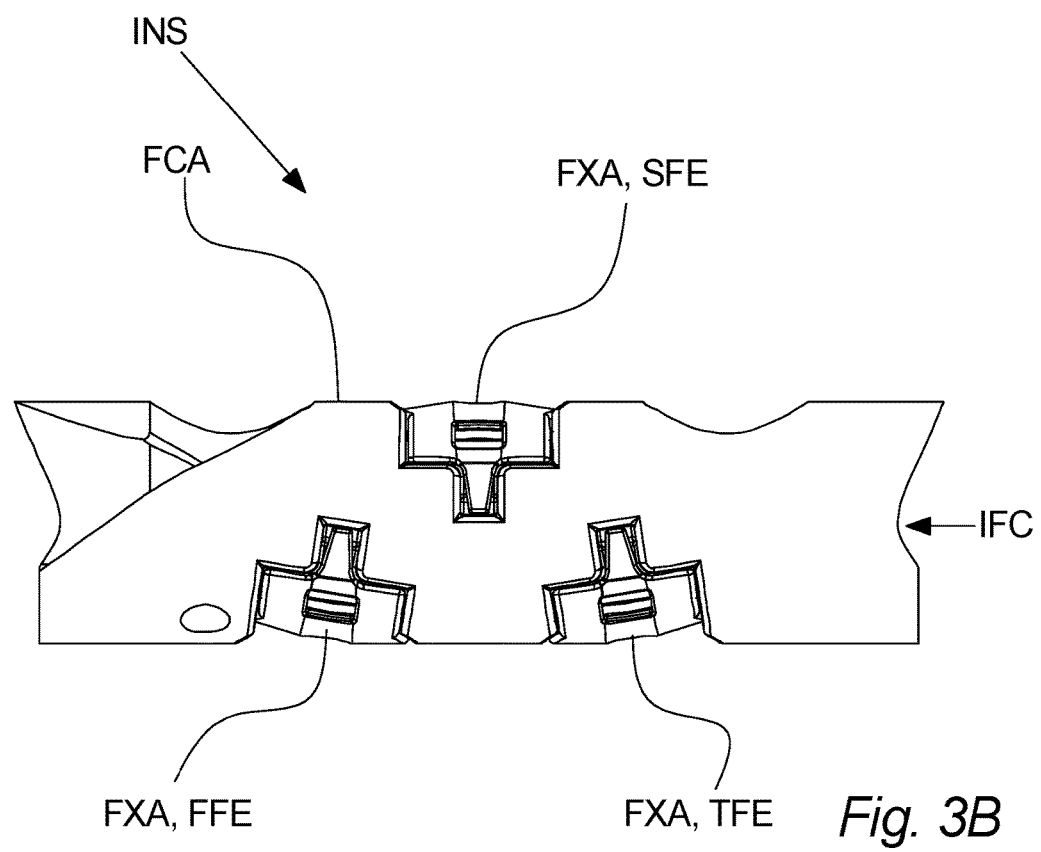
FIG. 3B illustrates a side view of a flow conduit insert according to an embodiment of the invention.

Now, on FIGS. 3A and 3B, a flow conduit insert INS according to an embodiment is illustrated. The flow conduit insert INS may be arranged as explained in relation to FIGS. 1 and/or 2.

On FIG. 3A, the flow conduit insert INS is seen from one end. As seen the flow controlling arrangement FCA defines an inner flow channel IFC of free space, i.e. where a fluid may flow.

The inner flow channel IFC may, according to different embodiments, be configured to define a substantially straight flow channel IFC, optionally having a substantially uniform diameter. However, in other embodiments, the inner flow channel IFC may bend or otherwise deviate from the straight configuration. It may, regardless of the shape of the inner flow channel IFC, i.e. straight or non-straight, the inner flow channel IFC may often be described by a minimum diameter, or alternatively by a minimum cross-sectional area or dimension. Here in should be understood that the cross-section defining the cross-sectional area or dimension is preferably in a plane being substantially perpendicular to the longitudinal axis of the flow conduit insert INS and/or of the flow conduit FC in which the flow conduit insert INS is to be inserted. Moreover, in some embodiments the inner flow channel IFC may define an opening extending through the entire length of the flow conduit insert INS, such that when seen from one end, as in FIG. 3A, the opening or part thereof is configured as a see-through opening, the see-through opening being defined by a particular minimum diameter and/or minimum cross-sectional area.

Another way of defining a minimum diameter or cross-sectional area of the inner flow channel IFC, may be that the inner flow channel IFC is configured for receiving a tube having a fixed diameter and/or cross-sectional area. The tube may be straight or may be bendable, however, as stated, having a fixed diameter and/or cross-sectional area.

In FIG. 3B, the flow conduit insert INS is shown also in assembled form, where the flow controlling arrangement FCA is hold together by the fixation arrangement FXA.

Figure 4A:
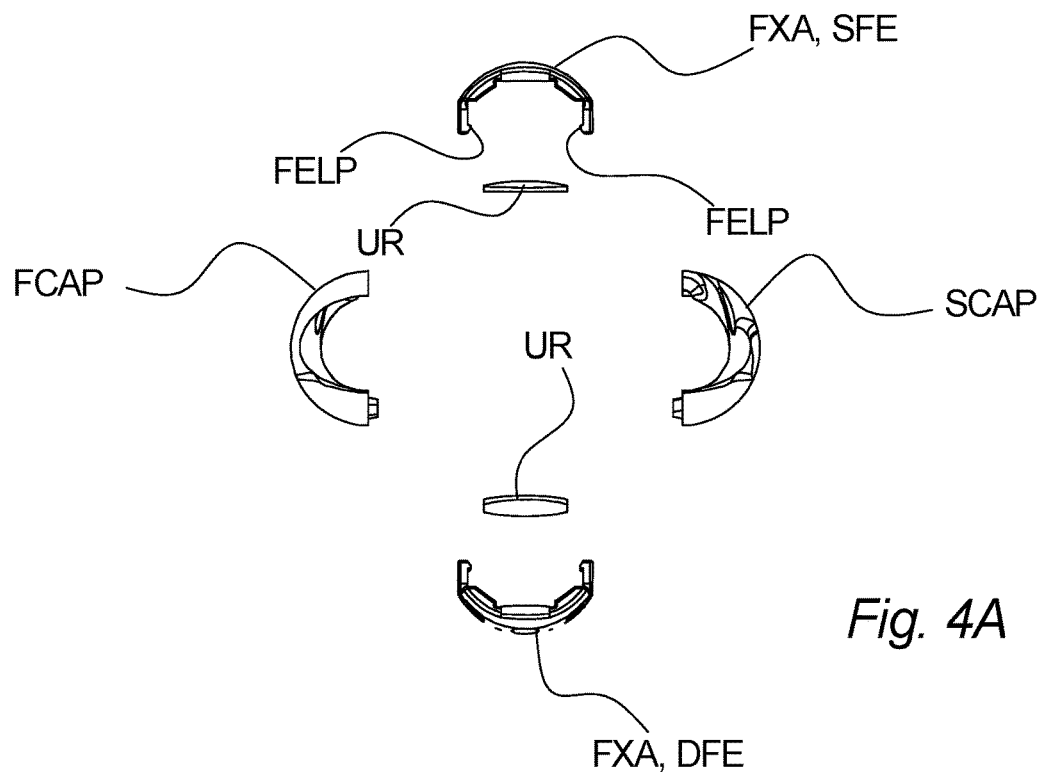
FIG. 4A illustrates an exploded end view of a flow conduit insert according to an embodiment of the invention.
Figure 4B:
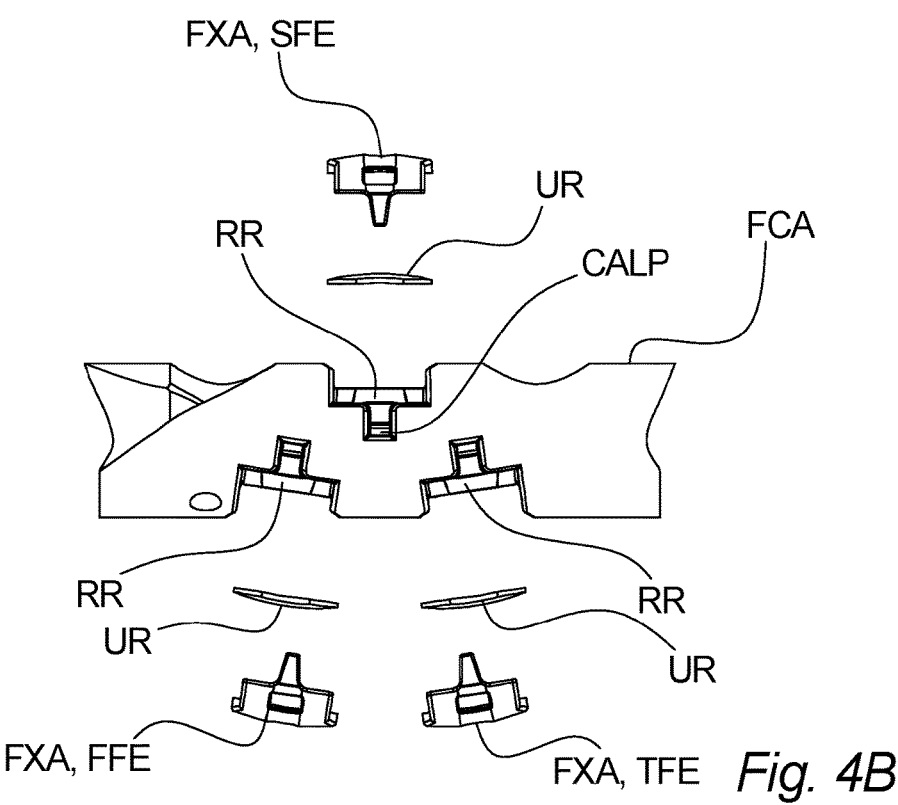
FIG. 4B illustrates an exploded side view of a flow conduit insert according to an embodiment of the invention.

Now referring to FIGS. 4A and 4B, a flow conduit insert INS according to an embodiment of the invention is illustrated. The flow conduit insert INS is shown in an exploded pre-assembly version, similar to that shown on FIG. 2, and shown in an end-view on FIG. 4A and a side-view on FIG. 4B.

It should be understood that the flow conduit insert INS may be devised according to any of the embodiments described in relation to FIGS. 1-3.

The fixation arrangement FXA may be devised as illustrated for the second fixation element SFE. The second fixation element SFE comprises two fixation element protrusions FELP, each pointing on a direction towards the opposite fixation element protrusion FELP, as shown in FIG. 4A. The flow controlling arrangement FCA comprises, in connection with the reflector recess RR for receiving the second fixation element SFE, two receiving fixation recesses CALP (only one shown), each for receiving a corresponding fixation element protrusion FELP. The fixation element protrusions FELP and the receiving fixation recesses CALP are configured to one and one engage each other to form a mechanical fixation. Thereby, as can be seen on FIG. 4A, the first and second controlling arrangement parts FCAP, SCAP are locked together to form the flow controlling arrangement FCA. It is to be understood that one or more or all of the fixation elements FFE, SFE, TFE of the fixation arrangement FXA may be formed in the same or similar manner.

Referring to FIGS. 5A and 5B, an ultrasonic flow meter UFM is illustrated according to an embodiment of the invention.

On FIG. 5A, the assembly is illustrated. The ultrasonic flow meter UFM comprises a flow conduit FC, flow conduit insert INS, a meter housing MH, housing locking arrangement HLA, and an electronic control arrangement ECA. Furthermore, the ultrasonic flow meter UFM comprises one or more ultrasonic transducers UT (not shown on FIG. 5A, shown in FIG. 5B), preferably two transducers UT. The electronic control arrangement ECA is shown on FIG. 5A as a block, and it should be understood that it may comprise different components.

One example of a method of assembling the ultrasonic flow meter UFM is illustrated as follows. The flow conduit insert INS is inserted axially into the flow conduit FC. Then, the meter housing MH, preferably with the electronic control arrangement ECA installed inside, is attached to the flow conduit FC. The meter housing MH may preferably comprise two projections (shown most clearly in FIG. 5B) extending through side openings of the flow conduit FC. The projections of the meter housing MH may then engage openings or recesses in the flow conduit insert INS, thereby locking the position of the flow conduit insert INS relative to the flow conduit FC. Then, the meter housing MEI is locked to the flow conduit FC by the housing locking arrangement HLA, which may e.g. as illustrated comprise locking pins and a receiving section on the meter housing MH and the flow conduit FC.

As illustrated on FIG. 5A, the flow conduit insert INS is preferably configured to have an outer diameter corresponding substantially to the inner diameter of the flow conduit FC.

The longitudinal center axis LA of the flow conduit FC is illustrated on FIG. 5A and on FIG. 5B.

As illustrated on FIG. 5B, the electronic control arrangement ECA may preferably comprise a battery BAT for powering the ultrasonic flow meter UFM and a microcontroller MCR. Furthermore, these parts may be electrically interconnected as shown on FIG. 5B, where the ultrasonic transducers UT and an interface SCR are also connected to the microcontroller MCR. Finally, the electronic control arrangement ECA and the interface SCR may preferably be protected by a see-through window GLA, such as a glass window. The interface SCR may e.g. be a screen or another apparatus for showing details of the amount of fluid, e.g. accumulated fluid that has passed the ultrasonic flow meter UFM and/or the instantaneous flow. Other data, such as a serial number of the meter UFM, may also be provided. Some ultrasonic flow meters UFM may not comprise an interface SCR or screen.

In connection with above embodiments, it should be understood that the flow conduit insert INS is adapted an ultrasonic flow meter UFM, i.e. the flow conduit insert INS comprises openings or through-holes allowing an ultrasound signal transmitted form a transducer of the ultrasonic flow meter UFM to propagate without being obstructed by the flow controlling arrangement FCA via the one or more ultrasound reflector UR to its destination, such as a second transducer of the ultrasonic flow meter UFM.

Figure 6A:
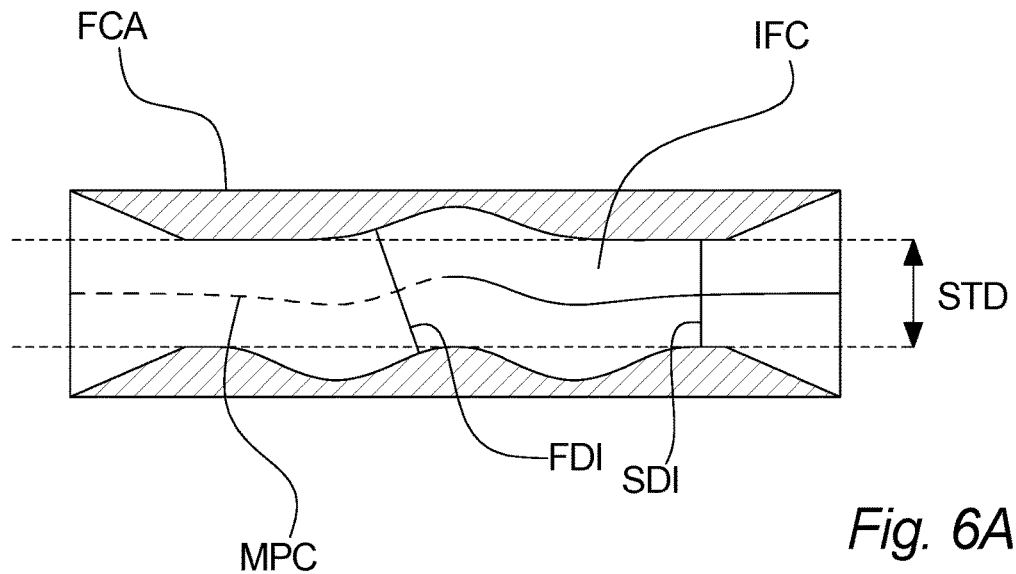
FIG. 6A illustrates a cross-sectional side view of a flow controlling arrangement according to an embodiment of the invention.
Figure 6B:
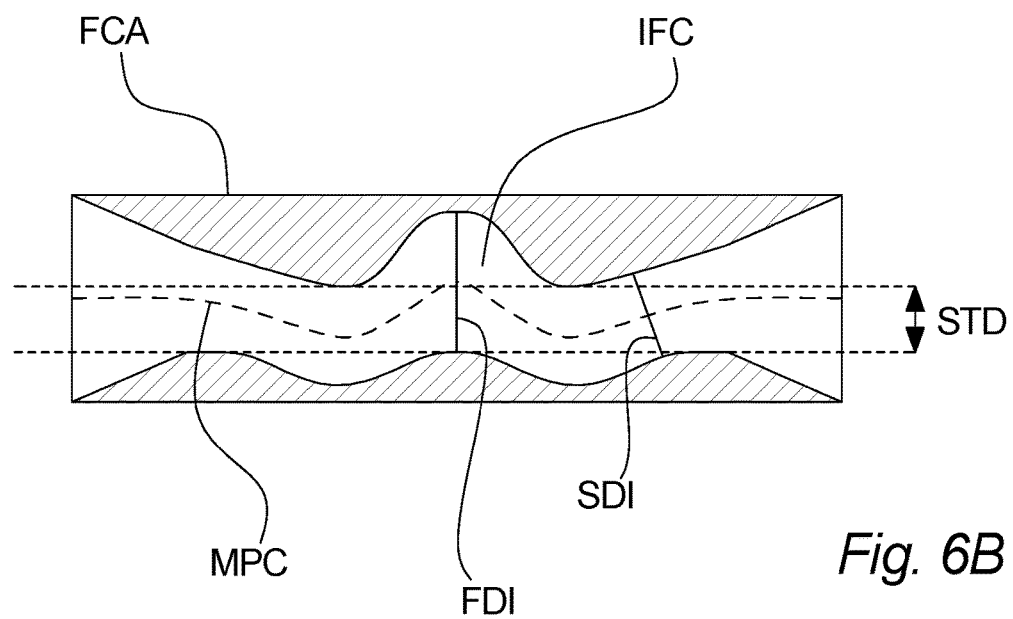
FIG. 6B illustrates a cross-sectional side view of a flow controlling arrangement according to an embodiment of the invention.

Referring to FIGS. 6A and 6B, flow controlling arrangements FCA according to embodiments of the invention are shown.

FIG. 6A illustrates a flow controlling arrangement FCA defining an inner flow channel IFC, where a fluid can flow from one end of the flow controlling arrangement FCA to the opposite end. The midpoint curve MPC of the inner flow channel IFC is illustrated. Also, a first and a second diameter FDI, SDI are shown to illustrate the fact that the inner flow channel may have different diameters along the midpoint curve MPC. As can be seen from FIG. 6A, the second diameter SDI is here the minimum diameter of the inner flow channel IFC.

Furthermore, the inner flow channel IFC defines a see-through diameter STD, which is also illustrated. The see-through diameter STD corresponds to the diameter of the see-through part of the inner flow channel IFC.

As can be seen on FIG. 6A, the see-through diameter STD for this embodiment corresponds to the minimum diameter of the inner flow channel IFC, i.e. the second diameter SDI.

If the inner flow channel IFC has a non-circular cross-section, such as e.g. an elliptical cross-section, the relevant parameter with respect to the see-through part would typically be the minimum width of the inner flow channel IFC, which for an elliptical cross-section would be the twice the semi-minor axis. Often, however, the inner flow channel IFC may throughout some or all of its length has a more irregular cross-section. Again, the relevant parameter with respect to the see-through part would then typically be the minimum width of the inner flow channel IFC, i.e. as the minimum cross sectional dimension.

Now referring to FIG. 6B, a flow controlling arrangement FCA is illustrated, again with a midpoint curve MPC, a first and second diameter FDI, SDI, and a see-through diameter STD. As illustrated here, the see-through diameter STD is smaller than the minimum diameter of the inner flow channel IFC, which is here shown as the second diameter SDI.

It should be understood, according to an example embodiment, that the flow controlling arrangement FCA, such as said controlling arrangement parts FCAP, SCAP, may be made substantially from a composite material, such as a glass reinforced polymer, such as polybutylene sulfide (PBS). However, alternative materials may also be used in some embodiment, preferably with a low reflectivity for ultrasound, so as to avoid unintended reflections.

It should be understood, according to an example embodiment, that the fixation arrangement FXA, such as said fixation elements FFE, SFE, TFE, may be made substantially from a composite material, such as a glass reinforced polymer, such as polybutylene sulfide (PBS). However, alternative materials may also be used in some embodiment, preferably with a low reflectivity for ultrasound, so as to avoid unintended reflections.

It should be understood, according to an example embodiment, that the meter housing MH, may be made substantially from a composite material, such as a glass reinforced polymer, such as polybutylene sulfide (PBS). However, alternative materials may also be used in some embodiment, such as e.g. brass. When choosing the material, the structural strength of the material remains an important parameter to provide a meter housing MEI that can withstand the pressure from the fluid.

LIST OF FIGURE REFERENCES

INS. Flow conduit insert
FC. Flow conduit
UFM. Ultrasonic flow meter
FCA. Flow controlling arrangement
FXA. Fixation arrangement
FCAP. Second controlling arrangement parts
SCAP. First controlling arrangement parts
IFC. Inner flow channel
LA. Longitudinal axis
UR. Ultrasound reflector
UT. Ultrasonic transducer
FFE. First fixation element
SFE. Second fixation element
TFE. Third fixation element
FELP. Fixation element locking part
CALP. First controlling arrangement locking part
RR. Reflector recess
SLO. Slot
RLA. Reflector locking arrangement
PRO. Projection
ECA. Electronic control arrangement
MH. Meter housing
HLA. Housing locking arrangement
GLA. See-through window
SCR. Interface
Bat. Battery
MCR. Microcontroller

The invention claimed is:

1. A flow conduit insert for inserting in a flow conduit of an ultrasonic flow meter,
said flow conduit insert being adapted for increasing the flow velocity of a fluid flowing through said flow conduit,
wherein said flow conduit insert comprises
a flow controlling arrangement, and
a fixation arrangement,
wherein said flow controlling arrangement defines an inner flow channel having free passage along the longitudinal center axis of the flow conduit over the entire length of the flow conduit insert,
wherein said fixation arrangement is arranged to fixate at least one ultrasound reflector.

2. The flow conduit insert according to claim 1, wherein said flow conduit insert is provided as a single, self-supporting flow conduit insert.

3. The flow conduit insert according to claim 1, wherein said flow controlling arrangement comprises at least two controlling arrangement parts,
wherein said fixation arrangement is arranged to lock the at least two controlling arrangement parts together to form a self-supporting flow conduit insert.

4. The flow conduit insert according to claim 1, wherein said at least two controlling arrangement parts are substantially symmetric.

5. The flow conduit insert according to claim 1, wherein said ultrasound reflector is fixated between said flow controlling arrangement and said fixation arrangement.

6. The flow conduit insert according to claim 3, wherein said fixation arrangement is arranged to fixate said at least two controlling arrangement parts to each other.

7. The flow conduit insert according to claim 3, wherein said fixation arrangement comprises one or more fixation elements, said one or more fixations elements each comprising one or more fixation element locking parts,
wherein said at least two controlling arrangement parts each comprises one or more controlling arrangement locking parts, and
wherein said one or more fixation element locking parts are adapted to engage said one or more controlling arrangement locking parts,
whereby said ultrasound reflector is fixated between said flow controlling arrangement and said fixation arrangement, and
whereby said at least two controlling arrangement parts is fixated to each other.

8. The flow conduit insert according to claim 1, wherein said fixation arrangement comprises a reflector locking arrangement for receiving and fixating said ultrasound reflector.

9. The flow conduit insert according to claim 8, wherein said reflector locking arrangement provides fixation of said ultrasound reflector without contact between said ultrasound reflector and said flow controlling arrangement.

10. The flow conduit insert according to claim 1, wherein said flow controlling arrangement comprises one or more controlling arrangement parts, each of said controlling arrangement parts comprising a controlling arrangement locking part for connecting to said fixation arrangement.

11. The flow conduit insert according to claim 10, wherein said fixation arrangement comprises one or more fixation elements, each fixation element comprises at least one fixation element locking part for connecting and locking to said flow controlling arrangement, and wherein said fixation element locking part and said controlling arrangement locking part are adapted for interlocking by mechanically engaging each other.

12. The flow conduit insert according to claim 1, wherein said ultrasonic flow meter comprises at least two ultrasound reflectors, wherein said at least two ultrasound reflectors each are fixated between said at least two controlling arrangement parts on one side and said fixation arrangement on the other side.

13. The flow conduit insert according to claim 1, wherein said flow conduit insert comprises a reflector recess for receiving said ultrasound reflector.

14. The flow conduit insert according to claim 13, wherein said flow controlling arrangement comprises an opening from said inner flow channel to the outside of said flow controlling arrangement, and wherein said opening substantially coincides with said reflector recess.

15. The flow conduit insert according to claim 13, wherein said fixation arrangement is adapted to fixate said ultrasound reflector in said reflector recess.

16. The flow conduit insert according to claim 1, wherein said flow conduit insert is adapted for fixating an ultrasound reflector of said ultrasonic flow meter to said flow controlling arrangement via a fixation arrangement.

17. The flow conduit insert according to claim 1, wherein said fixation arrangement comprises one or more fixation elements, each of said one or more fixation elements having a maximum dimension not exceeding 80% of the diameter of the flow conduit.

18. The flow conduit insert according to claim 1, wherein said inner flow channel has a minimum see-through cross-sectional dimension of at least 30% of the diameter of the flow conduit.

19. The flow conduit insert according to claim 1, wherein said fixation arrangement comprises two or more fixation elements, wherein said two or more fixation elements are substantially identical.

20. A flow conduit insert for inserting in a flow conduit of an ultrasonic flow meter,
said flow conduit insert being adapted for increasing the flow velocity of a fluid flowing through said flow conduit,
wherein said flow conduit insert comprises
a flow controlling arrangement, and
a fixation arrangement,
wherein said flow controlling arrangement defines an inner flow channel having free passage along the longitudinal center axis of the flow conduit over the entire length of the flow conduit insert, and
wherein said flow controlling arrangement comprises at least two controlling arrangement parts,
wherein said fixation arrangement is arranged to lock the at least two controlling arrangement parts together to form a self-supporting flow conduit insert.

21. An ultrasonic flow meter, said ultrasonic flow meter comprising
flow conduit for transport of a fluid to be measured,
a flow conduit insert for increasing the flow velocity of a fluid flowing through said flow conduit,
at least one ultrasonic transducer for transmitting or receiving an ultrasonic signal, and
at least one ultrasound reflector for reflecting said ultrasound signal,
wherein said flow conduit insert comprises a flow controlling arrangement,
wherein said flow conduit insert is inserted in said flow conduit, and
wherein said flow controlling arrangement defines an inner flow channel having free passage along the longitudinal center axis of the flow conduit over the entire length of the flow conduit insert.

* * * * *